US008454238B2

(12) United States Patent
Parsoneault et al.

(10) Patent No.: US 8,454,238 B2
(45) Date of Patent: Jun. 4, 2013

(54) SPINDLE REGIONS

(75) Inventors: Norbert Steven Parsoneault, Scotts Valley, CA (US); Gregor Flores, Felton, CA (US); Robert Alan Nottingham, Santa Cruz, CA (US); Troy Michael Herndon, San Jose, CA (US); Jeffry Arnold LeBlanc, Aptos, CA (US)

(73) Assignee: Seagate Technology LLC, Cupertino, CA (US)

( * ) Notice: Subject to any disclaimer, the term of this patent is extended or adjusted under 35 U.S.C. 154(b) by 951 days.

(21) Appl. No.: 11/509,220

(22) Filed: Aug. 23, 2006

(65) Prior Publication Data
US 2008/0050057 A1 Feb. 28, 2008

(51) Int. Cl.
F16C 32/06 (2006.01)
H02K 5/16 (2006.01)

(52) U.S. Cl.
USPC .............................. 384/107; 310/90

(58) Field of Classification Search
USPC ............. 384/107, 121, 100–106, 108–120, 384/122–124; 3/107; 310/90; 360/98.07, 360/99.04, 99.08
See application file for complete search history.

(56) References Cited

U.S. PATENT DOCUMENTS

| | | |
|---|---|---|
| 4,132,414 A | 1/1979 | Dinsdale |
| 5,328,270 A | 7/1994 | Crawford et al. |
| 5,347,189 A | 9/1994 | Chuta et al. |
| 5,423,612 A | 6/1995 | Zang et al. |
| 5,427,456 A | 6/1995 | Hensel |
| 5,448,120 A | 9/1995 | Schaule et al. |
| 5,487,608 A | 1/1996 | Leuthold et al. |
| 5,516,212 A | 5/1996 | Titcomb |
| 5,524,986 A | 6/1996 | Leuthold et al. |
| 5,533,812 A | 7/1996 | Leuthold et al. |
| 5,536,088 A * | 7/1996 | Cheever et al. ............... 384/107 |
| 5,577,842 A | 11/1996 | Parsoneault et al. |
| 5,601,125 A | 2/1997 | Parsoneault et al. |
| 5,653,540 A | 8/1997 | Heine et al. |
| 5,678,929 A | 10/1997 | Parsoneault et al. |
| 5,685,647 A * | 11/1997 | Leuthold et al. ............... 384/113 |
| 5,716,141 A | 2/1998 | Chen |
| 5,793,129 A | 8/1998 | Parsoneault et al. |
| 5,806,987 A * | 9/1998 | Nose et al. ................... 384/100 |
| 5,847,479 A | 12/1998 | Wang et al. |
| 5,908,247 A | 6/1999 | Leuthold et al. |
| 5,925,955 A | 7/1999 | Norris |
| 5,940,246 A | 8/1999 | Khan et al. |
| 5,956,204 A | 9/1999 | Dunfield et al. |
| 5,969,903 A | 10/1999 | Parsoneault et al. |
| 5,977,674 A | 11/1999 | Leuthold et al. |
| 5,980,113 A | 11/1999 | Grantz |
| 6,019,516 A | 2/2000 | Leuthold et al. |
| 6,055,126 A | 4/2000 | Kennedy et al. |
| 6,065,877 A | 5/2000 | Leuthold et al. |

(Continued)

Primary Examiner — Alan Waits

(57) ABSTRACT

According to various embodiments of the invention, a motor with a rotatable hub having fluid dynamic journal and thrust bearings can be assembled from four major components: a spindle, a hub, a thrust washer, and a base. The spindle can integrate journal bearing, axial limiter, and ring seal functions. The hub can integrate journal bearing, thrust bearing, ring seal, axial limiter, capillary seal, and bumper functions. The thrust washer can integrate thrust bearing and lubricant circulation functions. The base can integrate capillary seal and lubricant storage and circulation functions. Each function can be integrated as structural feature in its corresponding component. The spindle, hub, and thrust bearing can be preassembled. The base can be loaded with lubricant prior to assembly with the spindle/hub/thrust bearing combination.

21 Claims, 11 Drawing Sheets

U.S. PATENT DOCUMENTS

| | | | |
|---|---|---|---|
| 6,066,903 A * | 5/2000 | Ichiyama | 310/90 |
| 6,118,620 A | 9/2000 | Grantz et al. | |
| 6,137,650 A | 10/2000 | Heine et al. | |
| 6,144,523 A | 11/2000 | Murthy et al. | |
| 6,148,501 A | 11/2000 | Grantz et al. | |
| 6,149,159 A | 11/2000 | Kloeppel et al. | |
| 6,149,161 A | 11/2000 | Grantz et al. | |
| 6,183,135 B1 | 2/2001 | Kloeppel et al. | |
| 6,271,612 B1 * | 8/2001 | Tanaka et al. | 310/90 |
| 6,280,088 B1 | 8/2001 | Leuthold et al. | |
| 6,285,527 B1 | 9/2001 | Kennedy et al. | |
| 6,296,390 B1 | 10/2001 | Wolff et al. | |
| 6,296,391 B1 | 10/2001 | Hayakawa et al. | |
| 6,402,383 B1 | 6/2002 | Parsoneault et al. | |
| 6,575,634 B2 | 6/2003 | Nottingham | |
| 6,583,952 B1 | 6/2003 | Grantz et al. | |
| 6,594,883 B2 | 7/2003 | Kloeppel et al. | |
| 6,982,510 B1 | 1/2006 | Aiello et al. | |
| 7,134,791 B2 * | 11/2006 | Yokoo | 384/107 |
| 7,182,516 B2 * | 2/2007 | Beckers | 384/107 |
| 7,586,223 B2 * | 9/2009 | Hishida et al. | 310/67 R |
| 2003/0174911 A1 * | 9/2003 | Oe | 384/107 |
| 2004/0184688 A1 * | 9/2004 | Le et al. | 384/107 |
| 2004/0208404 A1 | 10/2004 | Dittmer et al. | |
| 2006/0078240 A1 * | 4/2006 | Braun | 384/107 |
| 2006/0188186 A1 * | 8/2006 | Akahori | 384/107 |
| 2007/0145837 A1 * | 6/2007 | Herndon et al. | 310/67 R |

* cited by examiner

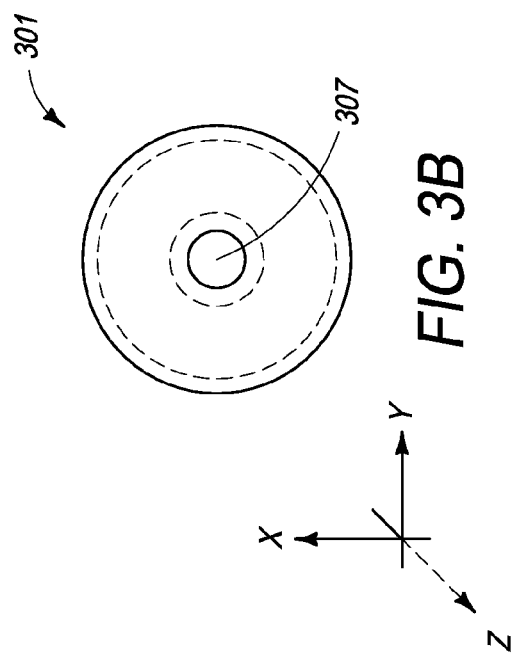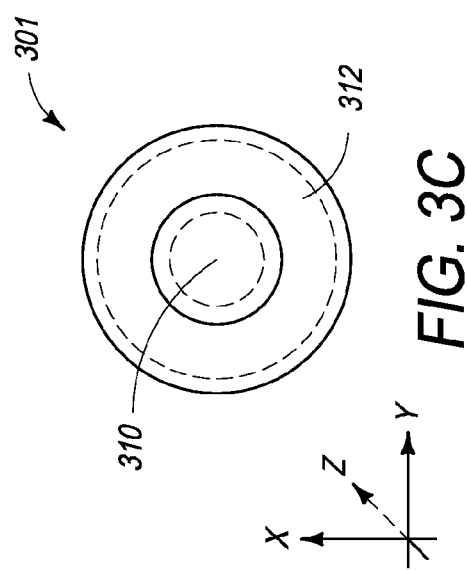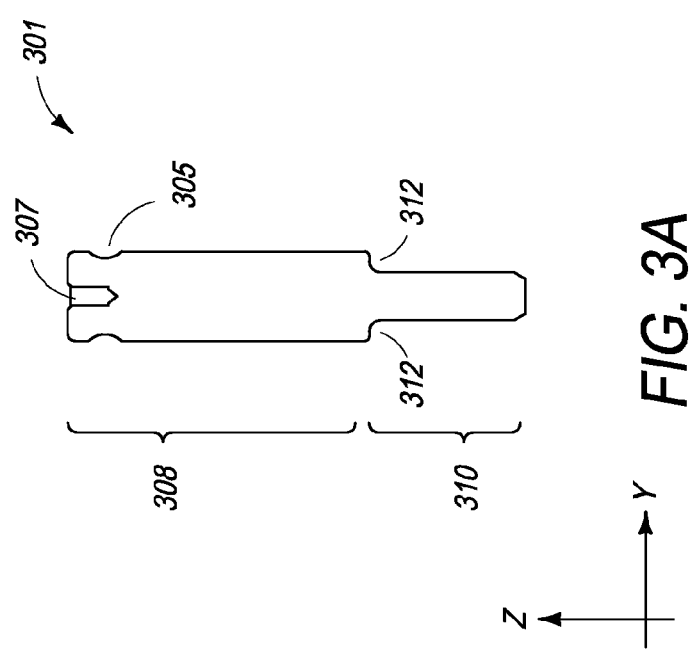

SPINDLE REGIONS

CROSS-REFERENCE TO RELATED APPLICATIONS

This application is copending with U.S. application Ser. No. 11/317,561, MOTOR ASSEMBLY WITH MULTIFUNCTIONAL COMPONENTS, filed Dec. 22, 2005, which is hereby incorporated herein by reference in its entirety.

TECHNICAL FIELD

Embodiments of the present invention relate to motor assemblies. In particular, some embodiments relate to motor assemblies having multifunctional components and fluid dynamic bearings for use with electronic memory systems, such as disc drive memory.

DESCRIPTION OF THE RELATED ART

Disc drive memory systems have been used in computers for many years for storage of digital information. Information is recorded on concentric memory tracks of a magnetic disc medium, the actual information being stored in the form of magnetic transitions within the medium. The discs themselves are mounted on a hub that is rotatably mounted on a fixed spindle. The information is accessed by means of read/write heads generally located on a pivoting arm that moves radially over the surface of the disc. The read/write heads or transducers must be accurately aligned with the storage tracks on the disc to ensure proper reading and writing of information.

The use of fluid dynamic bearing assemblies in such drive systems can be preferred due to desirable reductions in drive size and noise generation as compared to conventional ball bearing drive systems. In fluid dynamic bearings, a lubricating fluid can function as the bearing surface between a spindle and a hub. Such bearings are of the journal and thrust types. Journal bearings fix the radial position of a hub as it rotates around a spindle. Thrust bearings constrain the axial position of the hub as it rotates. In some designs, a single thrust bearing can constrain the axial position of a hub in one direction, while an axial magnetic force can constrain the position of the hub in an opposite axial direction.

To create fluid dynamic bearings, one, or the other, or both mating hub and spindle surfaces can be patterned with grooves and lands in various patterns to make lubricant fluid pumps that are actuated by the rotation of the hub relative to the spindle. Such pumps can maintain lubricant fluid pressure gradients while the hub is rotating, providing thrust and journal bearing functions. When the hub is not rotating, lubricant fluids can be maintained in place in the hub-to-spindle gap by capillary forces.

Lubricant fluid loss can occur at an end of the spindle, and can be an operational lifetime limiting factor for such disc drives. Sealing techniques include pumping seals, capillary seals, labyrinth seals, and ring seals. Pumping seals can be implement by biasing the opposing fluid pressures created by fluid dynamic bearings to promote a net fluid flow through the bearing, in addition to establishing an acceptable pressure within the bearing for bearing operation. Capillary seals are flared channels that rely on the surface tension of a lubricant fluid to form a meniscus as the walls of a channel flare apart. Capillary seals can also serve as reservoirs for lubricant fluid, but they are prone to lubricant loss through evaporation at the surface of the meniscus. Labyrinth seals can be used with capillary seals to further reduce lubricant evaporation by providing an elongate pathway for lubricant vapor to escape. Ring seals can combine features of capillary and labyrinth seals. Ring seals rely on the surface tension of a flared channel to form a meniscus, as do capillary seals. However, the walls of the channel subsequently converge to function as a labyrinth seal to reduce evaporation at the surface of the meniscus. Different seal designs can be used at each end of a spindle.

Computer disc drives have rapidly become commodity items, with memory storage capacities steadily increasing while costs generally decrease. Consequently motor assemblies for computer disc drives have simultaneously experienced price reductions along with improvements in performance, reliability, and operating lifetimes. Novel motor assemblies having fewer numbers of components, lower cost components, and reduced assembly costs—while maintaining or improving performance, reliability, and operating lifetimes—are sought.

BRIEF SUMMARY OF EMBODIMENTS OF THE INVENTION

According to various embodiments of the invention, a motor with a rotatable hub having fluid dynamic journal and thrust bearings can be assembled from four major components: (i) a spindle including a first end and a larger diameter first region adjacent the first end and including a second end and having a smaller diameter second region adjacent the second end and defining a shoulder extending between the first and second regions; (ii) a hub including a portion defining an inner sleeve sized to receive the spindle and to permit rotation of the hub about the spindle, the inner sleeve including a first end and a second end and defining an inward protruding generally annular shoulder adjacent the first end, the inward protruding shoulder defining an inner hub opening sized to permit passage therethrough by the second region of the spindle and to abut the spindle shoulder to thereby block passage therethrough by the first region of the spindle; (iii) a base defining an outer sleeve that includes a generally annular inner surface sized to receive the inner sleeve defining a portion of the hub and to permit rotation of the inner sleeve therein and defining a central hole sized to snugly receive the second end of the spindle and defining a shoulder extending from the central hole to the annular inner surface; and (iv) a thrust washer defining a central opening sized to snugly fit a portion of the second region of the spindle between the spindle shoulder and the second end of the spindle, the thrust washer having an outer diameter that is greater than a diameter of the inner hub opening and defining a gap permitting flow of lubricating fluid between the inner sleeve and the outer sleeve. Some embodiments further comprise a fluid dynamic journal bearing pattern formed in at least a portion of the inner sleeve facing the first region of the spindle. According to some of these embodiments, the journal bearing pattern is configured to pump a fluid toward the second end of the spindle. Some embodiments further comprise a bumper formed in at least a portion of the inner sleeve of the hub. According to some embodiments, the portion of the hub defining the inner sleeve of the hub, and the outer sleeve of the base define a capillary seal. Other embodiments further comprise a radial ring seal formed in facing surfaces of the first region of the spindle and the inner sleeve of the hub.

Other embodiments further comprise a fluid dynamic thrust bearing pattern formed in a surface of the thrust washer proximate to the shoulder of the hub. According to some of these embodiments, the thrust bearing pattern is configured to pump a fluid toward the second region of the spindle. According to further embodiments, the central hole of the thrust washer is configured to form a partial gap with the second region of the spindle. In some embodiments, the thrust bearing pattern is further configured to pump fluid toward the capillary seal through the partial gap.

Yet additional embodiments further comprise a plurality of electromagnets annularly disposed on the base, roughly coaxial with an axis between the first and second ends of the spindle, and a plurality of permanent magnets annularly disposed on the hub, facing the plurality of electromagnets, wherein the electromagnets are configured for activation to cause the hub to rotate relative to the base.

According to another embodiment, a method for assembling a fluid dynamic motor assembly, comprises: (i) inserting the second end of a spindle, the spindle including a first end and a larger diameter first region adjacent the first end and including the second end and having a smaller diameter second region adjacent the second end and defining a shoulder extending between the first and second regions, through the inner opening of a hub, the hub including a portion defining an inner sleeve sized to receive the spindle and to permit rotation of the hub about the spindle, the inner sleeve including a first end and a second end and defining an inward protruding generally annular shoulder adjacent the first end, the inward protruding shoulder defining the inner hub opening sized to permit passage therethrough by the second region of the spindle and to abut the spindle shoulder to thereby block passage therethrough by the first region of the spindle, and through a central opening of a thrust washer, the thrust washer defining the central opening sized to snugly fit a portion of the second region of the spindle between the spindle shoulder and the second end of the spindle, the thrust washer having an outer diameter that is greater than a diameter of the inner hub opening and defining a gap permitting flow of lubricating fluid between the inner sleeve and the outer sleeve, such that the second end of the spindle extends beyond the central hole of the thrust washer, thereby forming a subassembly of the fluid dynamic motor assembly; and (ii) affixing the second end of the spindle within a central hole of a base, the base defining an outer sleeve that includes a generally annular inner surface sized to receive the inner sleeve defining a portion of the hub and to permit rotation of the inner sleeve therein and defining a central hole sized to snugly receive the second end of the spindle and defining a shoulder extending from the central hole to the annular inner surface. According to various embodiments, the thrust washer can be affixed to the second end of the spindle end via a press-fit, via welding, or with an adhesive. According to various other embodiments, the central hole of the base can be affixed to the second end of the spindle end via a press-fit. According to some embodiments, the central hole of the base is at least partially filled with a lubricating fluid prior to the affixing of the second end of the spindle within. According to some further embodiments, the base further comprises a notch abutting the central hole, the notch being configured to permit the flow of a lubricating fluid during the affixing of the spindle within the central hole. According to some other embodiments, the second end of the spindle can have a flat or groove formed in a surface thereof, the flat or groove being configured to permit the flow of a lubricating fluid as the spindle is affixed within the central hole.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

FIGS. 3A, 3B, and 3C show side, top, and bottom views, respectively, of a spindle according to an embodiment.

Figure 1:
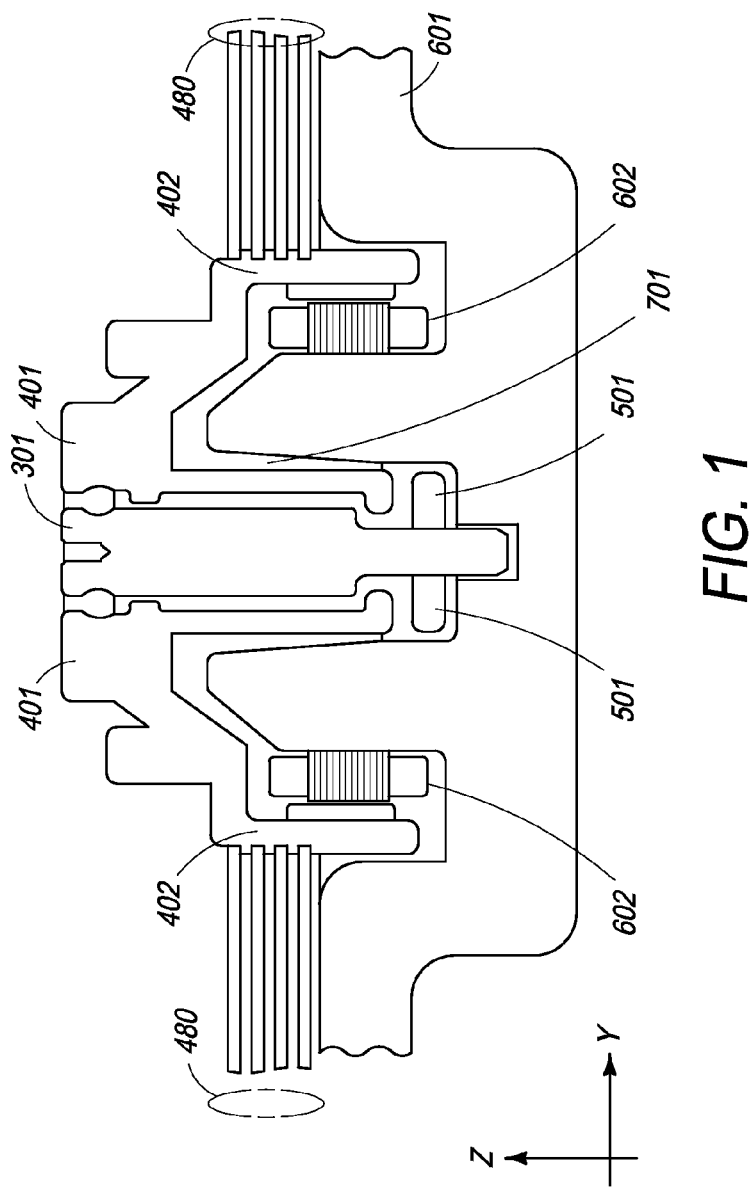
FIG. 1 presents a side, cross-sectional view of an embodiment of the invention.

Some of the figures are labeled with coordinate axes for a conventional x,y,z rectangular coordinate system that cross reference orientations and views among the figures. When the text herein refers to "top," it refers to a drawing aspect presenting itself as viewed from the positive z-axis direction. When the text refers to "bottom," it refers to a drawing aspect presenting itself as viewed from the negative z-axis direction. When the text herein refers to "side" it refers to an y-z or x-z plane view. Although the axes shown are in particular orientations in the drawings, the actual physical structures illustrated may be rotated to any particular orientation without performance impact, as long as relative component positions and alignments are maintained and unless otherwise stated.

The figures provided are merely representational and may not be drawn to scale. Certain proportions thereof may be exaggerated, while others may be minimized. The figures are intended to illustrate various embodiments of the invention that can be understood and appropriately carried out by those of ordinary skill in the art. Commonly designated elements among the various figures refer to common or equivalent elements in the depicted embodiments. The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in a variety of motors, including motors for use in disc storage drives. Motors for disc storage drives may be designed and may operate in a number of ways. The exemplary motors and other exemplary subject matter provided herein are for illustrating various aspects and are not intended to limit the range of motors and devices in which such examples and aspects may be applied.

FIG. 1 presents a side, cross-sectional view of a disc drive having an embodiment of the invention. During operation, a stack 480 of one or more discs can be rotated at very high speeds by an electric motor located inside the hub 401 that supports the discs. The type of motor is sometimes known as an "in-hub" motor. Such in-hub motors can have a hub mounted by means of fluid dynamic bearing systems to a fixed shaft (spindle) disposed in the center of the hub. In some embodiments, such motors include a stator formed in a base of the assembly, comprising a plurality of electromagnets 602 arranged roughly in a circle. Each of the electromagnets may be sequentially energized to polarize the stator. In some embodiments, a plurality of permanent magnets 402 can be disposed in alternating polarity on an inside rim of the hub, adjacent the stator. As the electromagnets are sequentially energized in alternating polarity, the magnetic attraction and repulsion of each stator to the adjacent magnet can cause the hub to rotate, thereby rotating the disc and passing the information storage tracks of a disc across a read/write head (not shown). The major, non magnetic, components of this embodiment are the spindle 301, the hub 401, the thrust washer 501, and the base 601, which are assembled as shown in the figure. Hub 401 is rotatably coupled to spindle 301, whereas thrust washer 501 and base 601 are irrotatably coupled to spindle 301.

Figure 2:
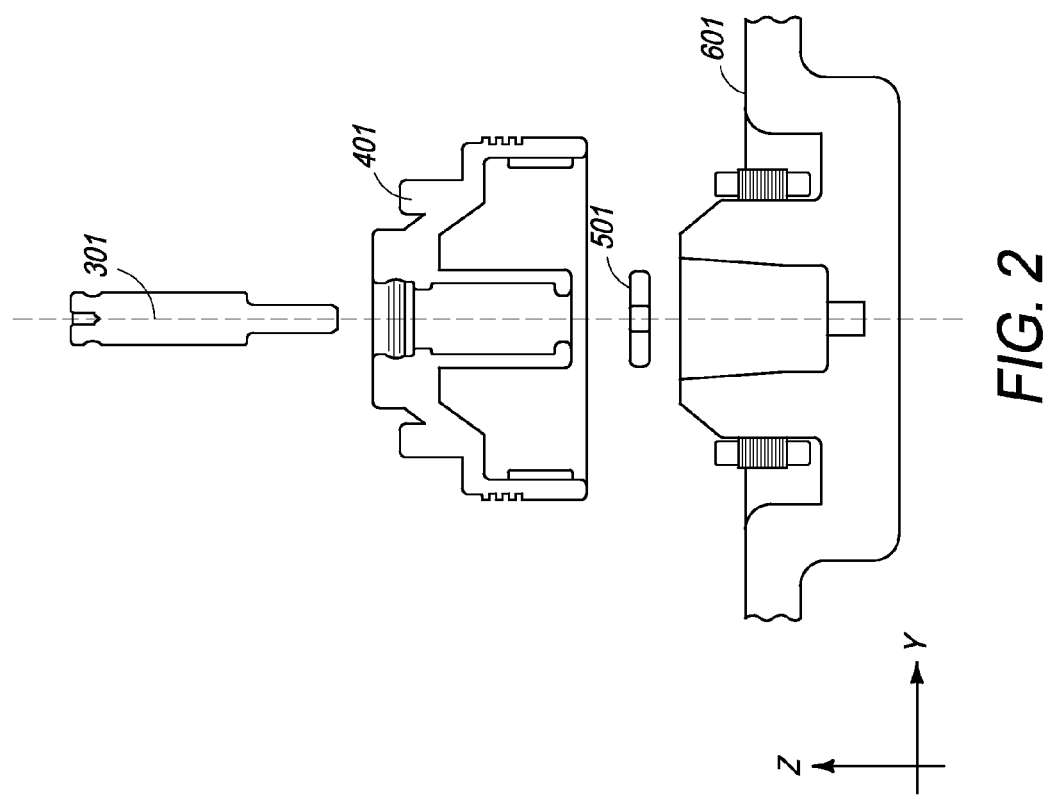
FIG. 2 presents an exploded, side, cross-sectional view of the embodiment of FIG. 1.

These components are more clearly seen in the exploded, side cross-sectional view shown in FIG. 2, and they are described below in more detail. The dashed vertical line in FIG. 2 is an axis of rotational symmetry, for purposes of illustration. Referring again to FIG. 1, a lubricating fluid 701 is shown within gaps between and among the major assembly components. In operation, hub 401 rotates about spindle 301, mounted to base 601, and a journal bearing is established in the gap between hub 401 and spindle 301. Thrust washer 501, is mounted to spindle 301 and provides a thrust bearing surface for hub 401. As used herein, journal bearings constrain the radial position of a hub as it rotates around a spindle and the thrust bearing constrains the negative z axial position of the hub as it rotates. According to some embodiments, the positive z axial position of the hub is constrained by an axially applied magnetic force between the stator and the plurality of permanent magnets. The use of fluid dynamic bearing assemblies in such drive systems has become preferred due to desirable reductions in drive size and noise generation as compared to conventional ball bearing drive systems. In fluid dynamic bearings, a lubricating fluid (or lubricant) functions as the bearing surface between a spindle and a hub. Depending on particular applications, the lubricating fluid can be a liquid or a gas.

FIGS. 3A, 3B, and 3C show side, top, and bottom views, respectively, of a spindle 301 according to an embodiment. The spindle 301 has top (first) and bottom (second) spindle end surfaces, a longitudinal spindle axis extending therebetween, and first 308 and second 310 radial spindle surfaces coupled to the first and second spindle end surfaces, respectively, wherein the first radial spindle surface encompasses a larger cross-sectional area than does the second radial spindle surface, and wherein a shoulder surface 312 of the spindle couples the first 308 and second 310 radial spindle surfaces. An optional tool hole 307 is shown to facilitate assembly operations. Annular groove 305 provides at least part of a ring seal.

Figure 4A:
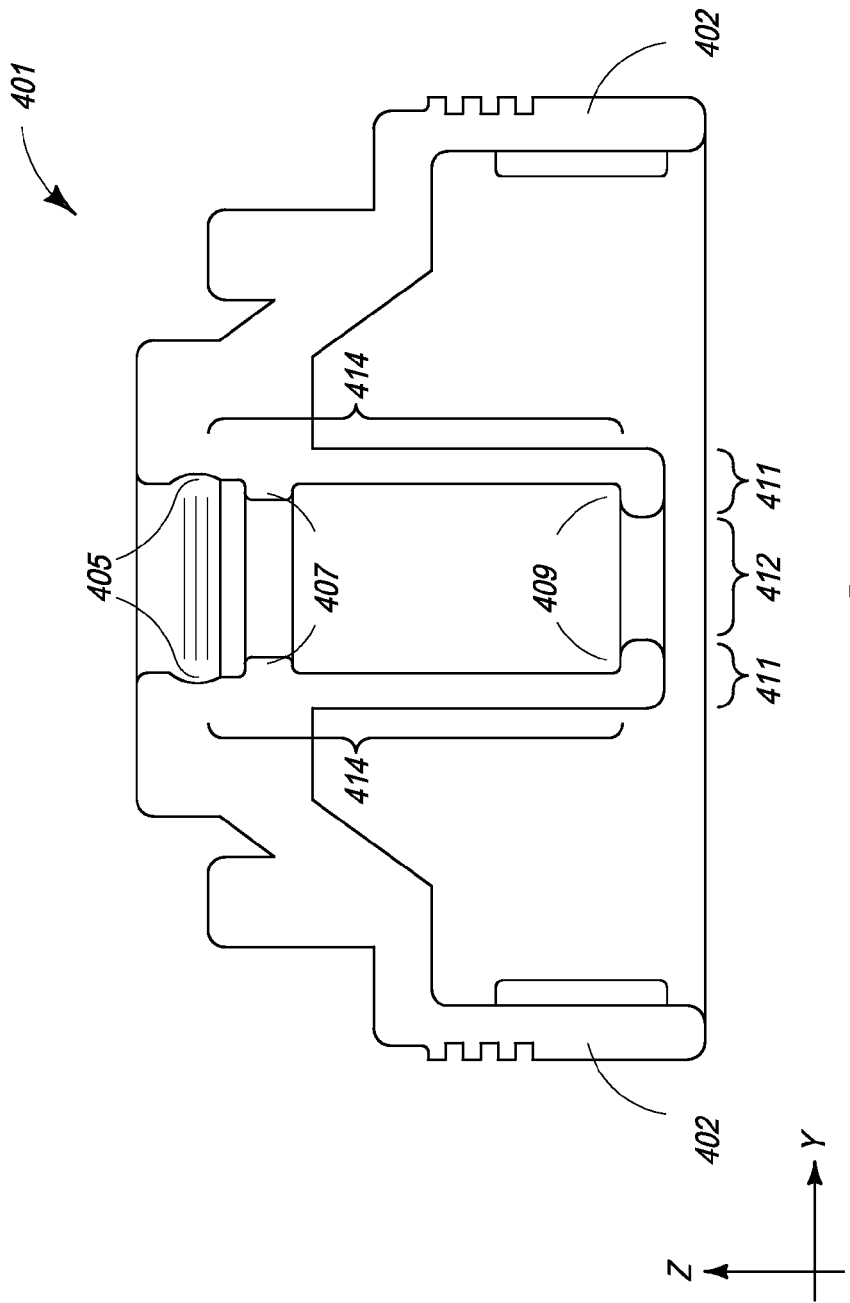
FIGS. 4A, 4B, and C show side, top, and bottom views, respectively, of a hub according to an embodiment.
Figure 4C:
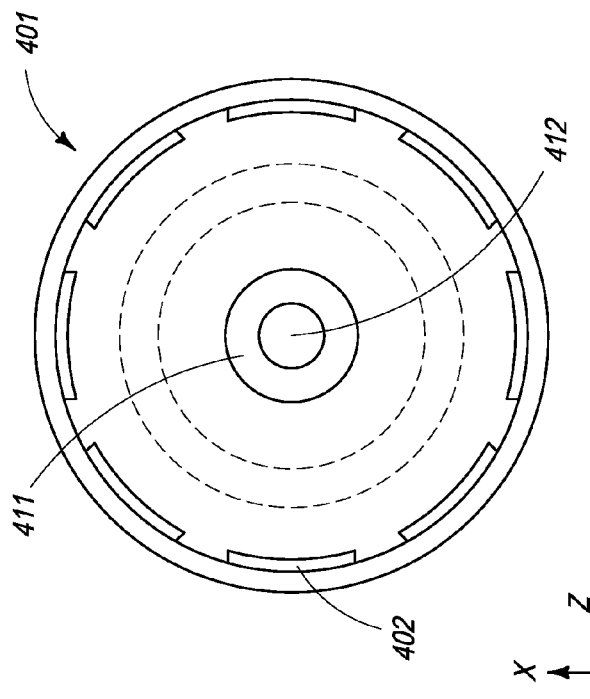
Figure 4B:
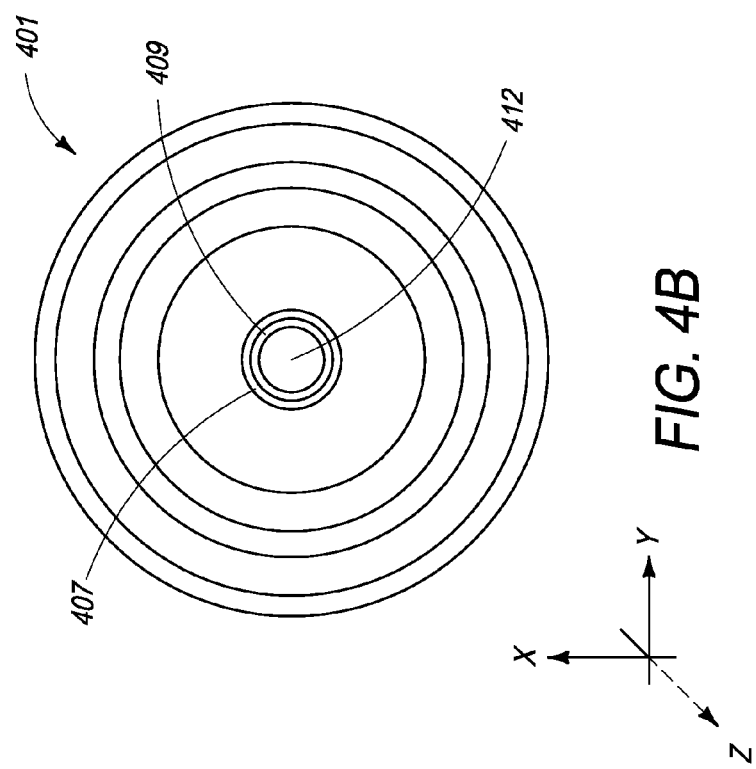

FIGS. 4A, 4B, and C show a cross-sectional side view, and top and bottom views, respectively, of a hub 401 having top (first) and bottom (second) hub end surfaces, a longitudinal hub axis extending therebetween, an inner radial hub surface (also referred to as the inner sleeve of the hub) 414 configured to rotatably surround at least a longitudinal portion of an inner radial spindle surface, an outer hub radial surface that is roughly coaxial with the inner radial hub surface, a hub shoulder surface 409 that is coupled to the inner radial hub surface 414 proximate to the bottom end, wherein the hub shoulder surface 409 and the bottom hub end surface have a longitudinal hub through-hole 412 therebetween that is configured to rotatably surround a longitudinal portion of the second radial spindle surface. Optional annular ridge 407, formed in inner radial hub surface, is a "bumper" that can limit the displacement (translational and/or angular) of the hub axis relative to the spindle axis, when assembled. The operation of the bumper is described below. Optional annular groove 405, formed in the inner radial hub surface can function alone, or in combination with a facing annular groove on the shaft (when assembled) as a ring seal (described above). A journal bearing pattern is shown as a surface pattern formed in the inner sleeve 414 of the hub, extending from the shoulder region 409 to above the bumper 407. If, after assembly, a hub rotates relative to the spindle, the journal bearing pattern can generate bearing lubricant pressure within the gap between the inner sleeve and the shaft. As illustrated, the journal bearing pattern is asymmetrical and capable of pumping lubricant away from the top (first) end of the spindle to serve as a pumping seal. Fluid dynamic bearing (FDB) patterns can be formed in a radial surface as a patterns of grooves and lands, or as a patterns of raised ridges and lands, and are well known in the art.

Figure 5B:
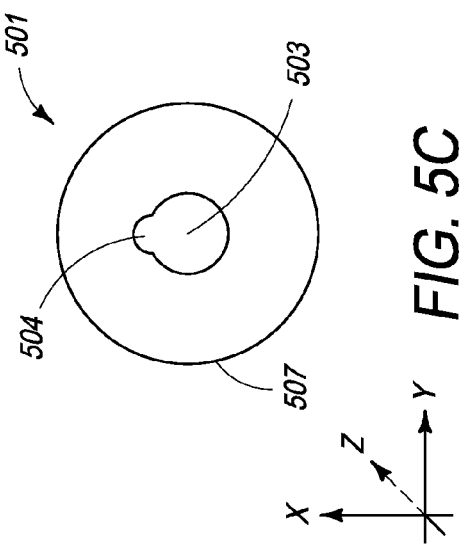
FIGS. 5A, 5B, and 5C show side, top, and bottom views, respectively, of a thrust washer according to an embodiment.
Figure 5C:
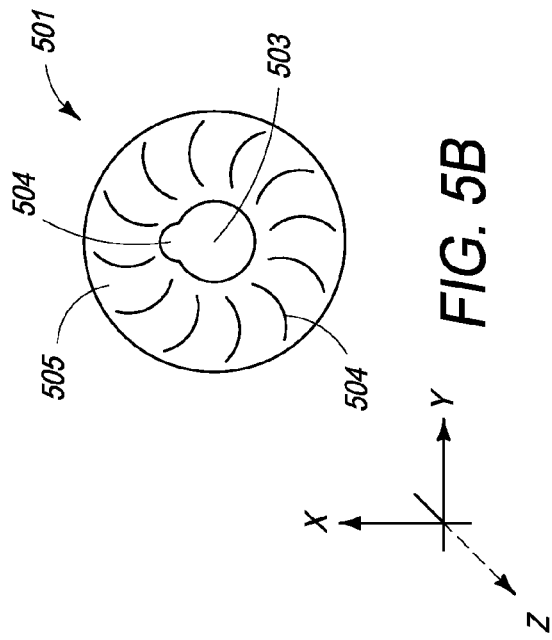
Figure 5A:
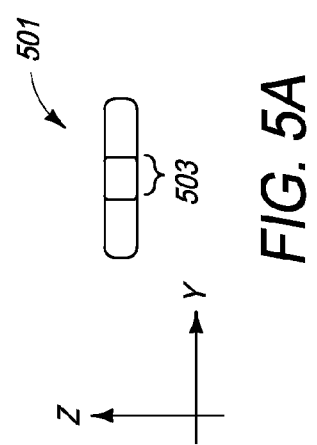

FIGS. 5A, 5B, and 5C show a cross-sectional side view, and top and bottom views, respectively, of a thrust washer having first 505 and second 507 washer surfaces, a thrust washer through-hole 503 therebetween comprising an inner annular surface, and an outer annular surface that couples the first and second thrust washer surfaces, wherein the thrust washer through-hole 503 is configured to accept the insertion of the second radial spindle surface therethrough. First thrust washer surface 503 is shown with a thrust bearing pattern formed therein. The thrust bearing pattern can be of generally the same herringbone type as described above in connection with the journal bearing pattern. According to other embodiments, the thrust bearing pattern can be of a spiral configuration. According to some embodiments the thrust bearing pattern can be stamped or "coined" into the thrust washer surface. According other embodiments, the thrust bearing pattern can be machined using mechanical, chemical, electrochemical, or optical techniques. FIGS. 5B and 5C show a cut-out notch 504 that is configured to provide a channel for axial lubricant flow when the thrust washer 501 is assembled with the spindle 301.

Figure 6A:
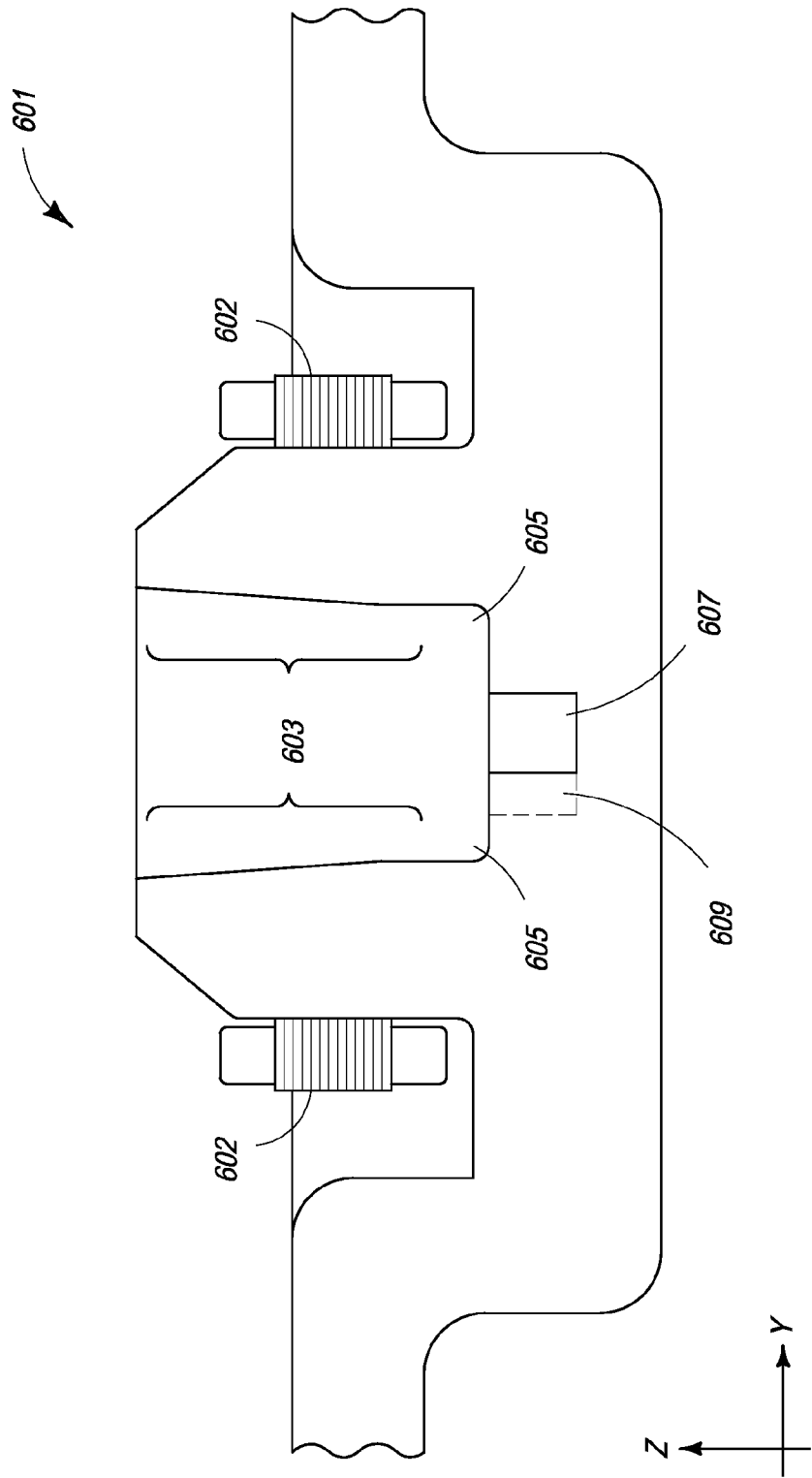
FIGS. 6A and 6B show side and top views, respectively, of a base according to an embodiment.
Figure 6B:
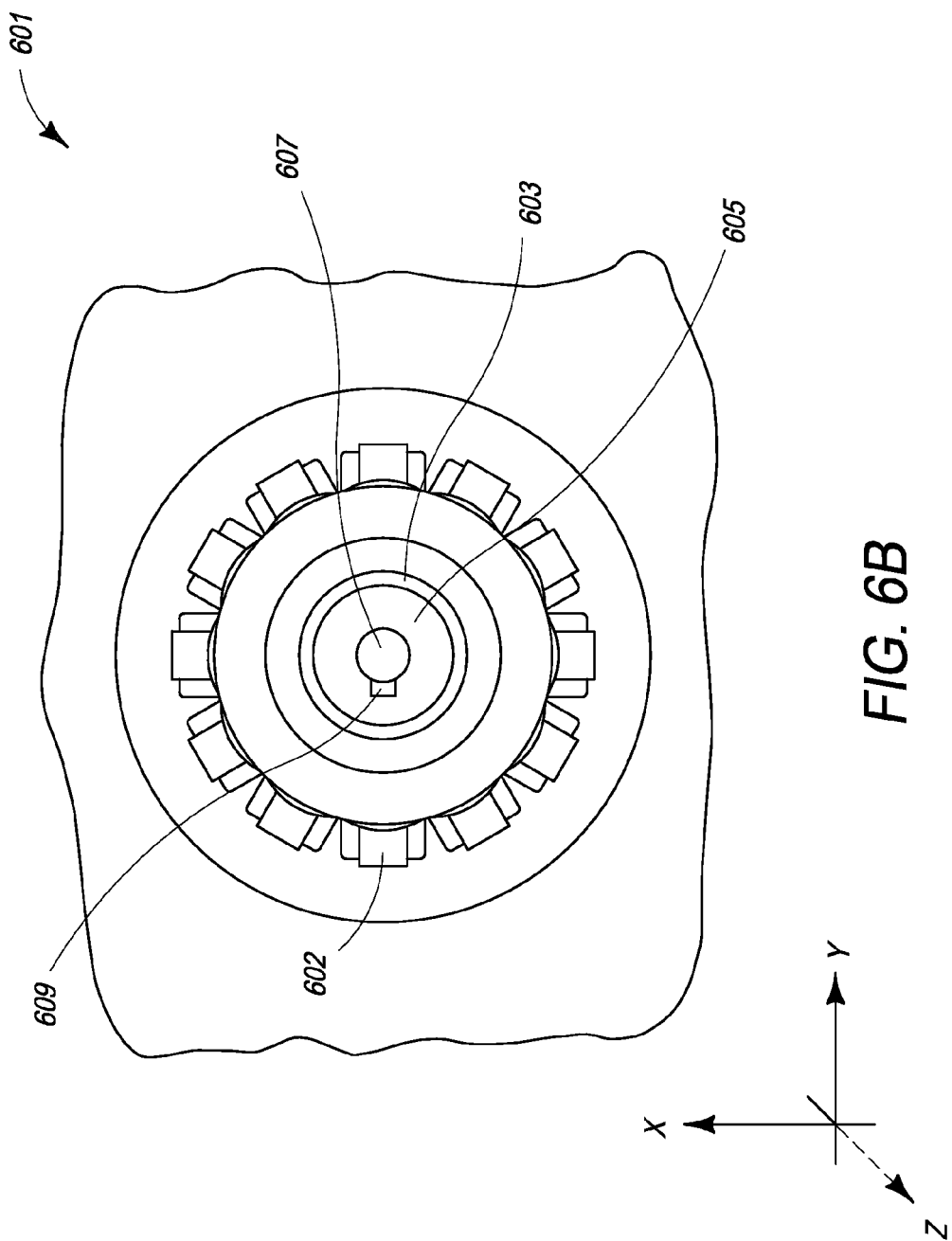

FIGS. 6A and 6B show a cross-sectional side view and a top view, respectively, of a base 601 having first and second, roughly coaxial, base blind-holes having respective radial surfaces, wherein the first base hole radial surface (also referred to as the outer sleeve of the base) 603 encompasses a greater cross-sectional area than does the second base hole radial surface 607, and having a base shoulder surface 605 coupling the first and second base hole radial surfaces, wherein the first base hole radial surface is configured to accept the insertion of the thrust washer therein, and the second base hole radial surface is configured to accept the insertion of the second radial spindle surface therein. According to some embodiments, notch 609, abutting the second base hole is optionally included to facilitate the flow of lubricant from the second base hole during assembly, as described below.

Figure 7:
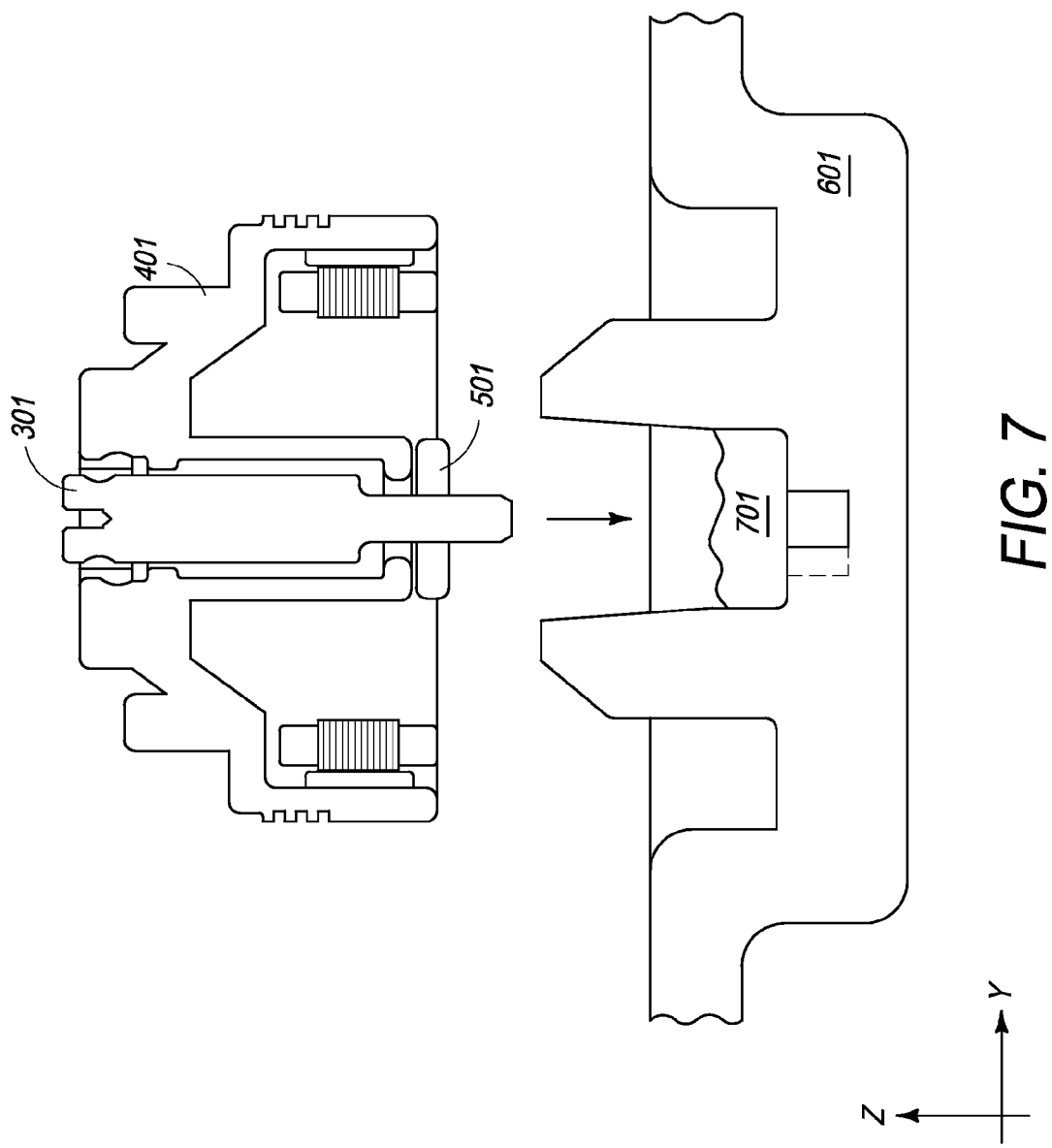
FIG. 7 illustrates an assembly operation according to an embodiment.

FIG. 7 illustrates an assembly operation of a fluid dynamic motor assembly, in which the shaft 301, the hub 401, and the thrust washer 501 form a pre-assembly. Because thrust washer 501 is irrotatably affixed to shaft 301, it serves to hold the pre-assembly together by capturing hub 401 on spindle 301. Base 601 can be easily loaded with a lubricant 701 in its blind holes before assembly with the pre-assembly, because access to the blind holes is unobstructed. The pre-assembly can then be assembled with the base by inserting the part of the shaft that extends beyond the thrust washer into the second base blind-hole. The shaft can be irrotatably affixed within the second base blind-hole by press-fit, in which the inner surface of the second base blind-hole and the radial surface of the shaft are configured so that insertion can be achieved with adequate insertion force, whereafter friction holds the two members together. According to some embodiments, notch 609, abutting the second base hole is optionally included to facilitate the flow of lubricant from the second base hole during the insertion of the spindle 301. Hub 401 remains axially captured upon spindle 301 by thrust washer 501, however hub 401 has rotational freedom about the longitudinal axis of spindle 301. Once assembled, the lubricant fluid can flow through pressure and/or capillary action to wet the appropriate gaps within the assembly.

Figure 8:
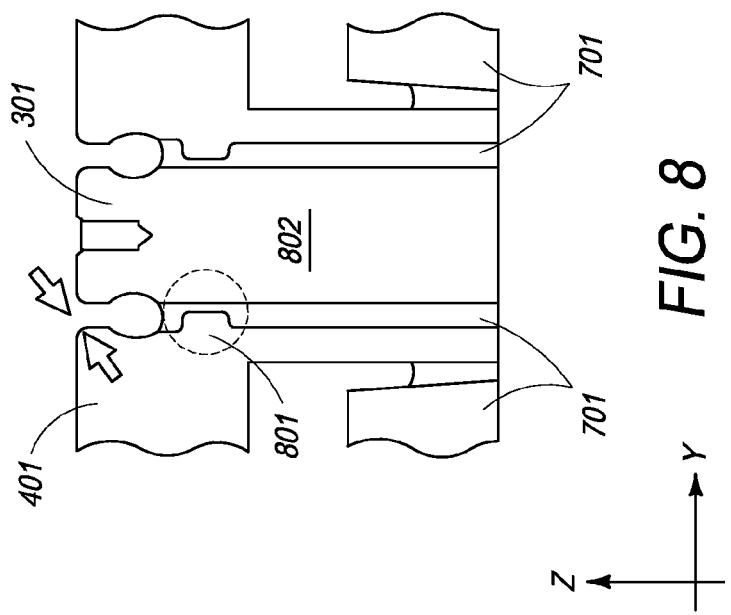
FIG. 8 illustrates a bumper operation according to an embodiment.

FIG. 8 illustrates a bumper operation according to an embodiment. The longitudinal axis of spindle 301 is displaced (shifted and/or tilted) from the longitudinal axis of hub 401 through the application of a differential force (indicated by the large arrows). The bumper limits this displacement by mechanical contact 801. By limiting the displacement, the lubricant level can be maintained at or above a level, for example 802, thereby reducing the chance of a direct and potentially damaging surface to surface contact between the spindle and hub (possibly without the mediation of a lubricant) during such a differential force incident.

Figure 9:
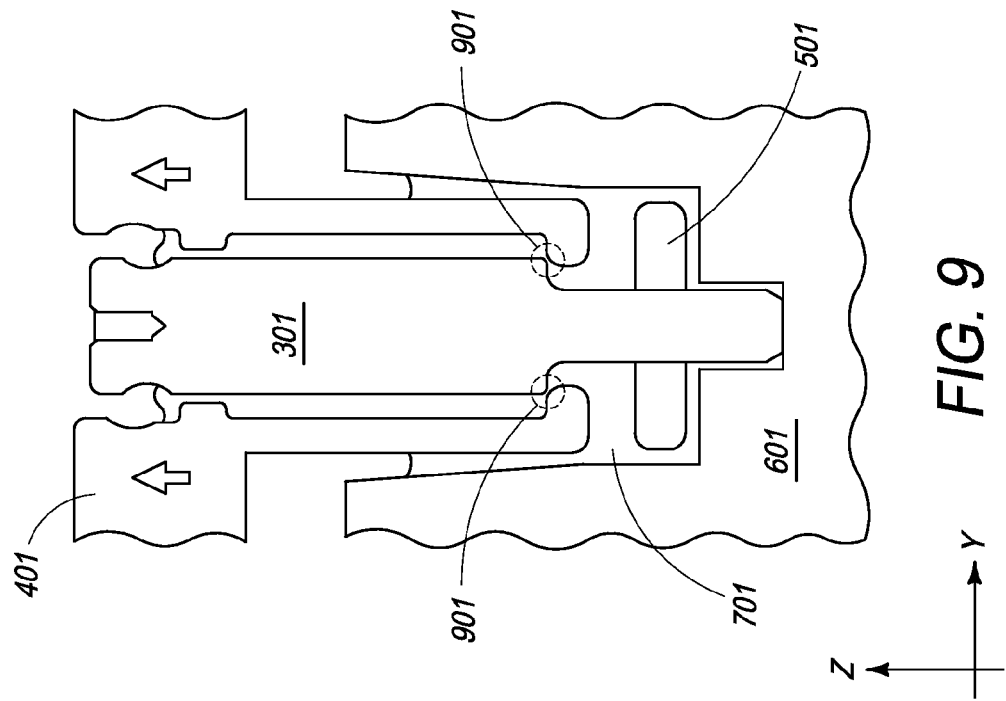
FIG. 9 illustrates a limiter operation according to an embodiment.

FIG. 9 illustrates a limiter operation according to an embodiment wherein the spindle shoulder surface and the hub shoulder surface are configured to limit an axial displacement of the hub relative to the spindle through mechanical interference 901. This can reduce the chance of hub 401 coming off spindle 301 in response a net differential force as illustrated by the black arrows. This can serve as a back-up mechanism to the axially applied magnetic force that normally limits the positive z axial displacement of the hub relative to the spindle.

Figure 10B:
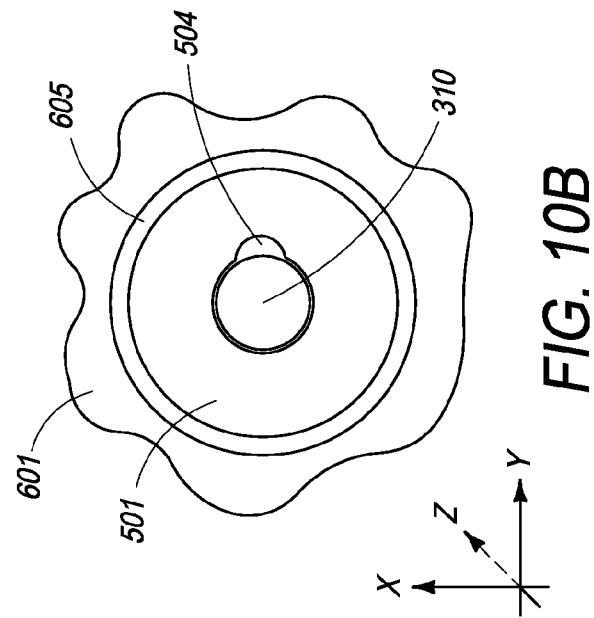
FIG. 10B shows a bottom view of a spindle and thrust washer according to an embodiment.
Figure 10A:
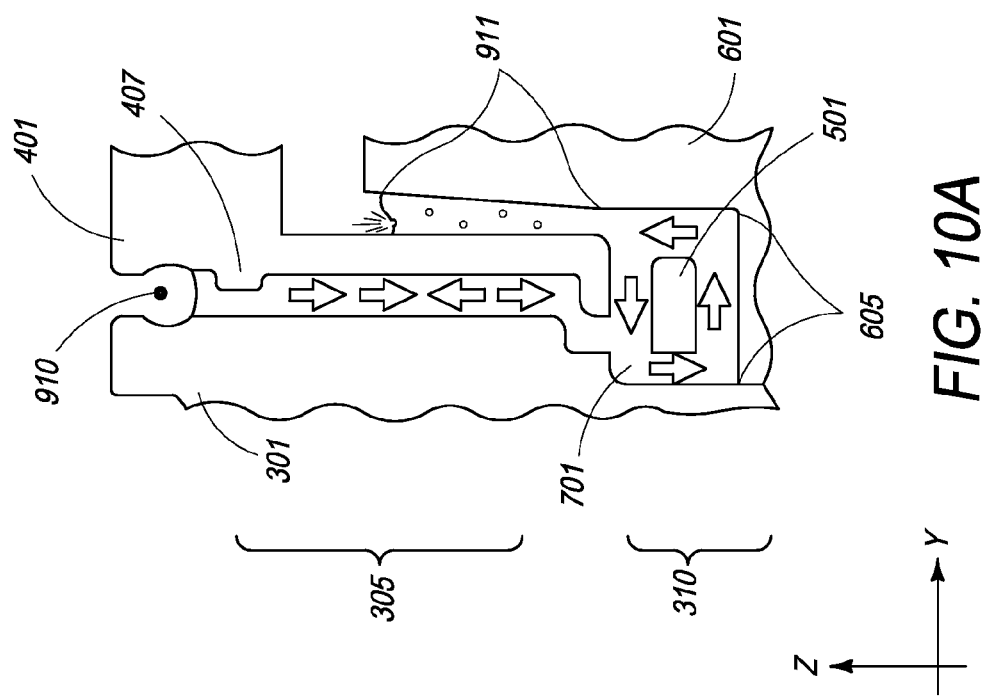
FIG. 10A illustrates fluid circulation according to an embodiment.

FIG. 10A illustrates lubricant 701 circulation during motor operation according to an embodiment. Journal bearing 305 functions as both a journal bearing and a pumping seal, directing lubricant toward thrust washer 501. Ring seal 901 is optionally included as a back-up seal for when the motor is not in operation. Thrust washer 501 has a thrust bearing pattern facing hub 401, than can be optionally biased to pump lubricant toward spindle 301.

FIG. 10B illustrates a cross-sectional view of the spindle 310, thrust washer 501 and base 601 assembly. Owing to the notch 504 within thrust washer 501, lubricant 701 can flow axially between shaft 301 and thrust washer 501. Lubricant can also flow axially between the outer perimeter of thrust washer 501 and the surface of the first base blind hole 605.

In summary, lubricant can flow between the shaft 301 and thrust washer 501, through the gap between hub 401 and base 601, and through the gap between the outer annular surface of thrust washer 501 and base 601, resulting in a lubricant circulation around thrust washer 501 as illustrated by the black arrows in FIG. 10A. A diverging gap between the hub 401 surface and the base 601 surface forms a capillary seal 911. The lubricant fluid connections between the journal bearing, the thrust bearing, the capillary seal, and the channels around the thrust washer provide lubricant circulation. This lubricant circulation can help expel bubbles that may be trapped in the lubricant via the capillary seal. The capillary seal 911 can also serve as a lubricant reservoir.

It should be understood that the invention can be practiced with modification and alteration within the spirit and scope of the appended claims. The description is not intended to be exhaustive or to limit the invention to the precise form disclosed, nor to limit the invention to the exemplary uses described. For example, when components are irrotatably coupled, it should understood that such coupling can include press-fit (with or without keying), welding, and gluing. As another example, when fluid dynamic bearings are formed in a gap between two surfaces, it should be understood that one, the other, or both surface may have bearing patterns formed thereupon. As yet a further example, when bumpers, capillary seals, labyrinth seals, or ring seals are formed between two opposing surfaces, they may be implemented as grooves or ridges in either one or both of the surfaces. Consequently, it should be understood that the invention can be practiced with modification and alteration and that the invention be limited only by the claims and the equivalents thereof.

The invention claimed is:

1. An apparatus comprising:
 a spindle including:
  a larger diameter first region adjacent a spindle first end;
  a smaller diameter second region adjacent a spindle second end; and
  a shoulder extending between the larger diameter first region and the smaller diameter second region;
 a hub including:
  an inward protruding annular shoulder adjacent a hub end;
  an inner hub opening, wherein
   the inner hub opening is operable to permit passage therethrough by the smaller diameter second region, and
   the inner hub opening is operable to block passage therethrough by the larger diameter first region; and
 a thrust washer between the hub and a base, wherein the hub rotates relative to the base, and wherein the thrust washer defines a central opening sized to fit a portion of the smaller diameter second region.

2. The apparatus of claim 1, further comprising a fluid dynamic journal bearing pattern formed in at least a portion of the hub facing the larger diameter first region.

3. The apparatus of claim 2, wherein the journal bearing pattern is configured to pump a lubricating fluid toward the spindle second end.

4. The apparatus of claim 3, further comprising a fluid dynamic thrust bearing pattern formed in a surface of the thrust washer.

5. The apparatus of claim 4, wherein the thrust bearing pattern is configured to pump the lubricating fluid toward the smaller diameter second region.

6. The apparatus of claim 5, wherein the central opening of the thrust washer is configured to form a gap with the smaller diameter second region.

7. The apparatus of claim 6, wherein the hub and the base define a capillary seal.

8. The apparatus of claim 7, wherein the thrust bearing pattern is further configured to pump fluid toward the capillary seal.

9. The apparatus of claim 1, further comprising a bumper formed in the hub.

10. The apparatus of claim 1, further comprising a radial ring seal formed in facing surfaces of the larger diameter first region and the hub.

11. The apparatus of claim 1, further comprising a plurality of electromagnets annularly disposed on the base, coaxial with an axis between the spindle first end and the spindle second end, and a plurality of permanent magnets annularly disposed on the hub, facing the plurality of electromagnets, wherein the electromagnets are configured for activation to cause the hub to rotate relative to the base.

12. An assembly comprising:
   a spindle including:
      a spindle first end;
      a first region adjacent the spindle first end;
      a spindle second end; and
      a second region adjacent the spindle second end, wherein the second region has a smaller diameter than the first region;
   a hub defining an inner sleeve sized to receive the spindle and to permit rotation of the hub about the spindle, wherein the inner sleeve includes:
      an inner sleeve first end;
      an inner sleeve second end; and
      an inward protruding annular shoulder adjacent the inner sleeve first end, wherein
         the inward protruding annular shoulder defines an inner hub opening, and
         the inner hub opening is sized to permit passage therethrough by the
      second region of the spindle, and to prevent passage therethrough by the first region of the spindle;
   a base defining an outer sleeve, wherein
      wherein the hub rotates relative to the base,
      the outer sleeve includes an inner surface sized to receive the inner sleeve,
      the outer sleeve permits rotation of the inner sleeve therein, and
      the outer sleeve defines a central hole sized to receive the spindle second end; and a thrust washer between the hub and the base, wherein
         a central opening in the thrust washer, wherein the central opening is defined by the thrust washer, and wherein further the central opening is sized to fit the smaller diameter of the second region, and
         the thrust washer further defines a gap operable to permit flow of lubricating fluid between the inner sleeve and the outer sleeve.

13. The assembly of claim 12, further comprising a fluid dynamic journal bearing pattern formed in at least a portion of the inner sleeve facing the first region of the spindle.

14. The assembly of claim 13, wherein the journal bearing pattern is configured to pump the lubricating fluid toward the spindle second end.

15. The assembly of claim 12, further comprising a fluid dynamic thrust bearing pattern formed in a surface of the thrust washer proximate to the inward protruding annular shoulder of the hub.

16. The assembly of claim 15, wherein the fluid dynamic thrust bearing pattern is configured to pump the lubricating fluid toward the second region of the spindle.

17. The assembly of claim 16, wherein the fluid dynamic thrust bearing pattern is further configured to pump fluid toward a capillary seal through the gap.

18. The assembly of claim 12, wherein the central opening of the thrust washer is configured to form a gap with the second region of the spindle.

19. The assembly of claim 12, further comprising a bumper formed in at least a portion of the inner sleeve of the hub.

20. The assembly of claim 12, further comprising a radial ring seal formed in facing surfaces of the first region of the spindle and the inner sleeve of the hub.

21. The assembly of claim 12, further comprising a plurality of electromagnets annularly disposed on the base, coaxial with an axis between the spindle first end and the spindle second end, and a plurality of permanent magnets annularly disposed on the hub, facing the plurality of electromagnets, wherein the plurality of electromagnets are configured for activation to cause the hub to rotate relative to the base.

* * * * *